Sept. 1, 1959 J. R. FURRER 2,901,986
SYSTEM FOR TRANSPORTING HIGHWAY TRAILERS BY RAIL
Filed June 29, 1954 4 Sheets-Sheet 1
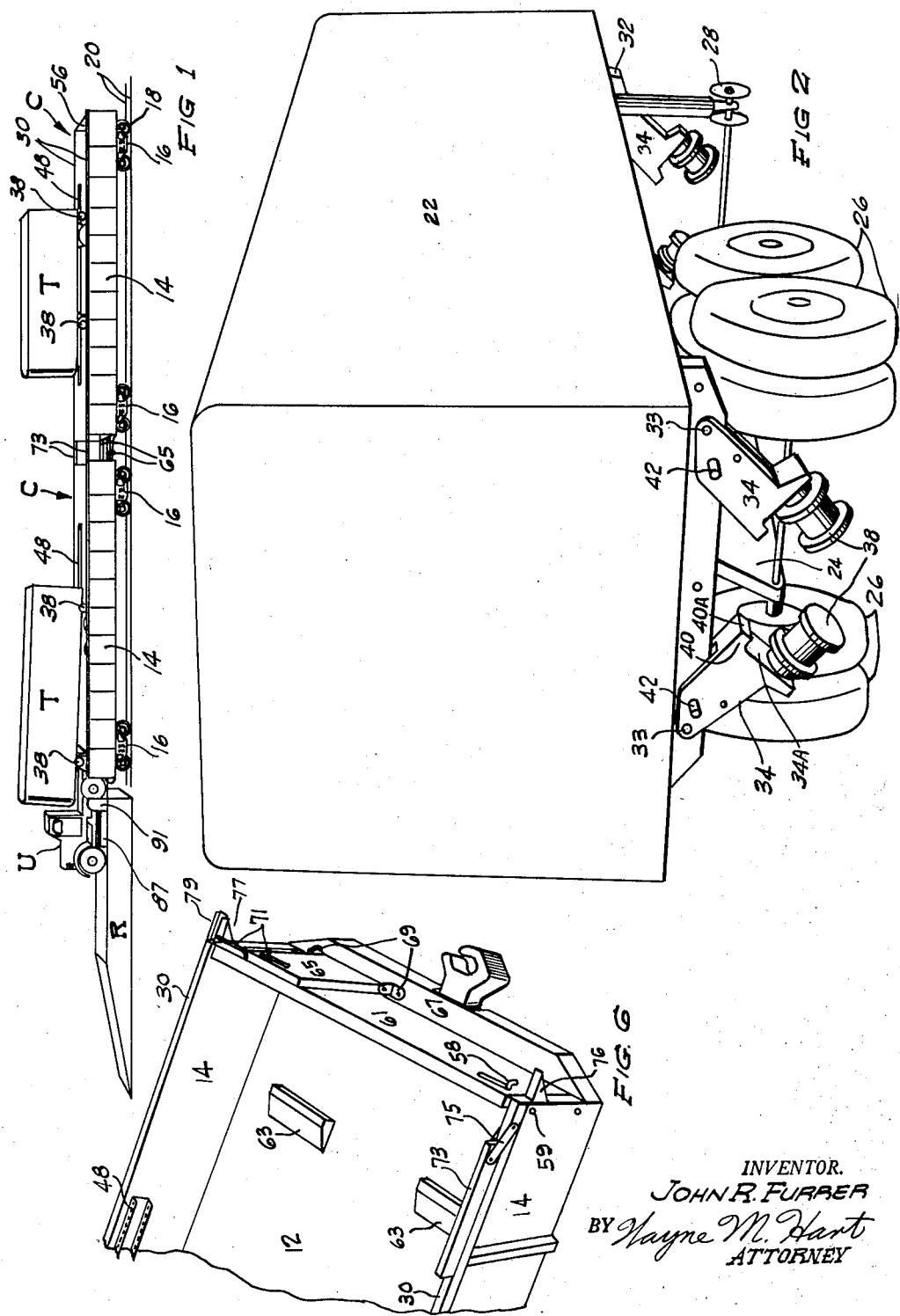
INVENTOR.
JOHN R. FURRER
BY Wayne M. Hart
ATTORNEY Sept. 1, 1959   J. R. FURRER   2,901,986
SYSTEM FOR TRANSPORTING HIGHWAY TRAILERS BY RAIL
Filed June 29, 1954   4 Sheets—Sheet 2

INVENTOR.
JOHN R. FURRER
BY Wayne M. Hart
ATTORNEY

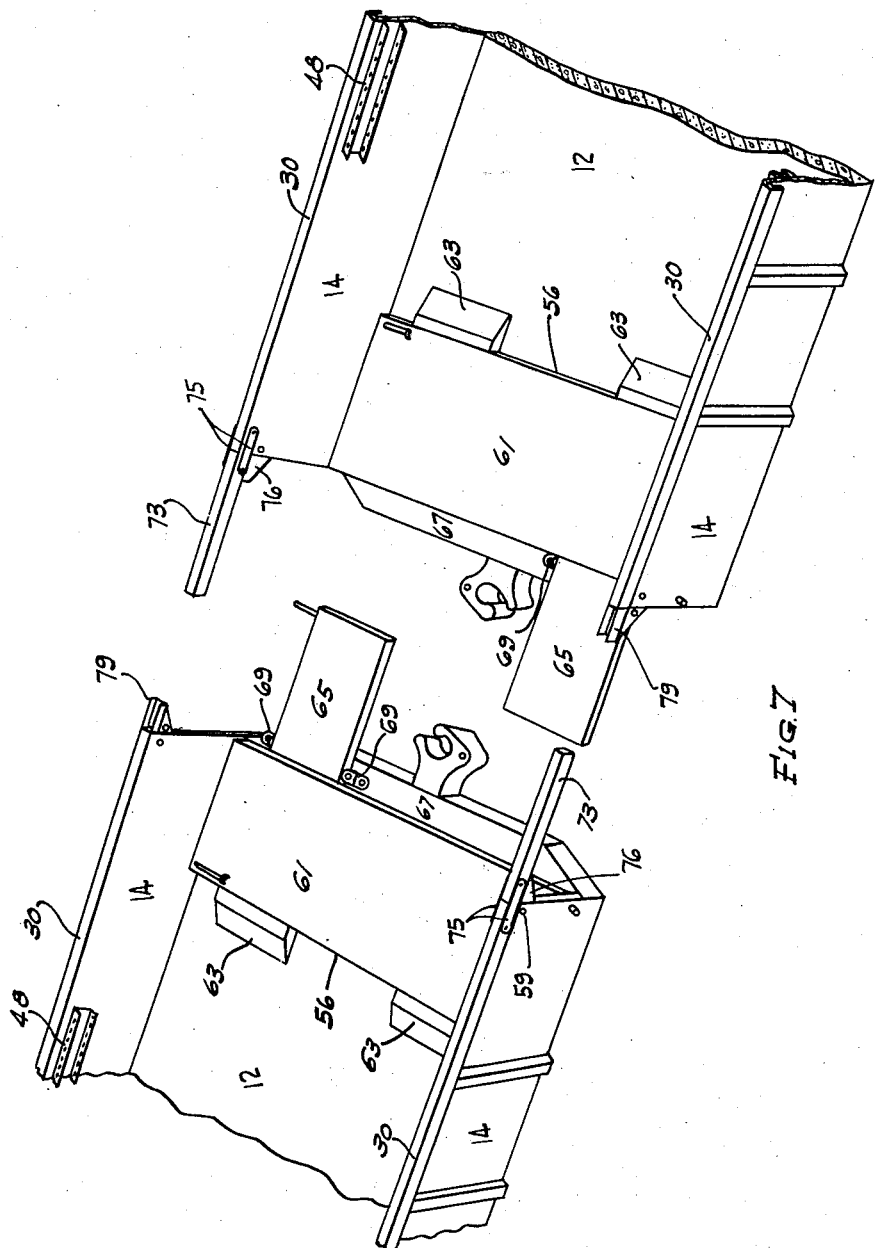

Sept. 1, 1959  J. R. FURRER  2,901,986
SYSTEM FOR TRANSPORTING HIGHWAY TRAILERS BY RAIL
Filed June 29, 1954  4 Sheets-Sheet 4

INVENTOR.
JOHN R. FURRER
BY Wayne M. Hart
ATTORNEY

2,901,986

SYSTEM FOR TRANSPORTING HIGHWAY TRAILERS BY RAIL

John R. Furrer, Buffalo, N.Y., assignor to ACF Industries, Incorporated, New York, N.Y., a corporation of New Jersey Application June 29, 1954, Serial No. 440,140

5 Claims. (Cl. 105—368)

This invention relates to a system of transporting highway trailers by rail and consists particularly in a novel method of and apparatus for loading and securing highway trailers to railroad cars.

Present systems for transporting highway trailers by rail utilize standard or specially built flat cars equipped with end ramps to provide communication between cars, and in some cases, provided with auxiliary guide walls or bumpers along the sides of the cars to help guide the trailers during the loading operation. With this type of equipment the process of securing the trailers to the flat cars frequently involves the steps of placing transverse wooden beams under the trailer at the front and rear, placing jacks under the beams, jacking the trailer off its springs to prevent side sway when the car is in motion, and attaching the corners of the trailer to the car floor by means of tie-down chains. It is evident from the foregoing that such methods and apparatus for transporting highway trailers by rail are relatively inefficient.

Accordingly, it is an object of this invention to provide an improved method of and apparatus for transporting highway trailers by rail.

It is a further object of this invention to provide a method and apparatus for this purpose in which conventional highway and railway vehicles may be used without substantial structural or design modifications.

It is a still further object to provide a novel means for transporting highway trailers by rail in which low-side gondola cars rather than flat cars are used.

I achieve the above and additional objects and advantages by providing conventional highway trailers with four small flanged auxiliary wheels attached near the four corners of the trailer underframe. These auxiliary wheels are at substantially the same height from a surface supporting the trailer as the vertical distance between the deck and side rail of a low-side gondola car and their gauge is substantially the same as the transverse horizontal distance between the side rails of the car, in order that the side rails may serve as a track for the auxiliary wheels. This solves two problems: it provides means for guiding the trailers onto the cars, and it takes the trailer load off the trailer's springs, transferring it directly to the side framing of the car. Inasmuch as it is obvious that the auxiliary wheels must extend outwardly from the sides of the trailer for registry with the side rails of gondola cars, and since, as is well known, present highway trailers are constructed to the maximum legal highway clearance limitations, the auxiliary wheels are attached to the trailer by means of pivoted brackets so that they may be swung under the trailer when it is being used in highway operations. For providing communication between adjacent gondola cars, so that a series of longitudinally arranged, coupled cars may be loaded simultaneously from an end loading ramp, I provide each of the cars with small communicating bridges for spanning the gap from one car floor to the next. I also equip the cars with communicating side rails so that trailers may be rolled from car to car on their auxiliary wheels. The communicating bridges and rails are located at diagonally opposite corners of the car in order to permit symmetrical coupling of cars so that any similarly equipped cars may be coupled and connected by means of these communicating elements without regard to the relative direction of the cars. The unloading ramp is similarly provided with mating communicating means for facility in transferring trailers from the ramp to the cars. For securing the trailers against vertical and longitudinal movement in the gondola cars, I mount a channel member on the inner walls of the car just below the side rail for registry with a boss on each of the auxiliary wheel brackets. The flanges of the channel member are perforated for the insertion of pins on either side of the wheel bracket bosses whereby to prevent longitudinal movement of the bosses in the channel, and consequent longitudinal movement of the trailer with respect to the gondola car.

In the drawings:

Fig. 1 is a side view of a loading ramp, a pair of coupled gondola cars, a loaded trailer, and a trailer being loaded.

Fig. 2 is a perspective view of a conventional highway trailer prepared for highway use with the auxiliary wheel retracted and the dolly wheels down.

Fig. 6 is a perspective view of an end of a gondola car incorporating my invention, with its end closed and communicating elements retracted.

Fig. 7 is a perspective view of the adjacent end portion of a pair of gondolas with their ends dropped and the communicating rails and ramps extended.

Figure 3:
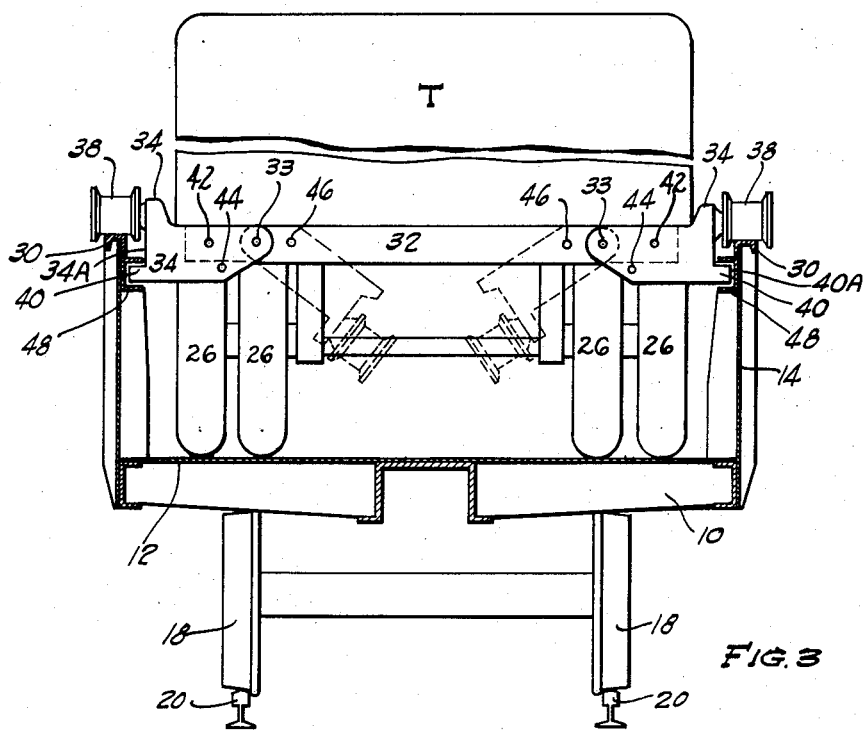
Fig. 3 is a transverse sectional view of a gondola car incorporating my invention with a highway trailer secured to it.
Figure 4:
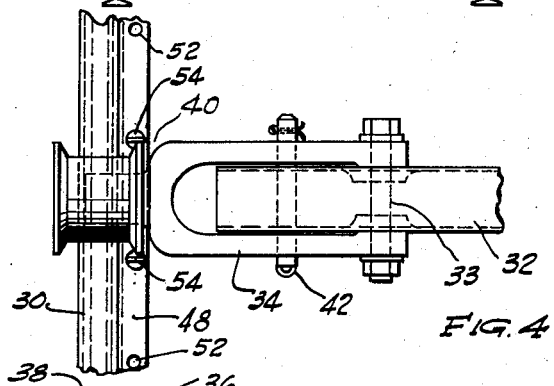
Fig. 4 is a detailed plan view of the auxiliary wheel mounting bracket and auxiliary wheel, gondola side rail, and locking channel.
Figure 5:
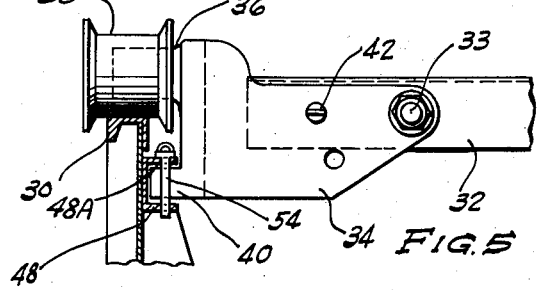
Fig. 5 is an elevational and sectional view corresponding to Fig. 4.

Referring now to the drawings, letter C refers to a low-side drop-end gondola car of substantially conventional construction consisting of an underframe 10, floor 12 and side walls 14. The entire body consisting of the above mentioned elements is supported at its ends by conventional freight car trucks 16 including track wheels 18 flanged for engagement with track rails 20.

The highway semi-trailer vehicle T of conventional construction, best shown in Fig. 2, consists of a box type body structure 22 resiliently mounted at its rear end on a bogie 24 provided with four dual wheels 26. The front end of the semi-trailer T is provided with a fifth wheel (not shown) for detachable engagement with a mating construction on the underframe of a conventional highway tractor unit such as U in Fig. 1. For supporting the forward end of the trailer when detached from the tractor unit, the trailer is provided with a set of vertically movable dolly wheels 28.

According to my invention, as pointed out heretofore, I utilize the side rails 30, which form the upper chord of side walls 14 of gondola cars C as a means for guiding trailers into position on the car and for supporting trailers when properly positioned thereon. To effectuate this, trailers are provided with heavy crossbearers 32 under the front and rear portions of their underframes, crossbearers 32 being, of course, rigidly secured to and forming part of the trailer underframe. To each end of crossbearer 32 is pivotally secured at 33 a bifurcated bracket member 34 provided at its outer end with a journal portion 36, on which is rotatably journalled double flanged wheel 38. Bracket 34 is also provided at its outer end with a boss 40, and with the surfaces 34A, 40A both of which are substantially vertical when the bracket is extended, and the purpose of which will be described in greater detail below. The spacing between the pivot points 33 is such, that the gauge of wheels 38 is slightly less than the transverse horizontal distance between the opposite side rails 30. When the brackets are in their extended position, as most clearly shown in Fig. 3, the brackets are held in this position by pins 42 passing through registering holes in the bracket and the crossbearer. Thus, it is evident that with the brackets extended horizontally and beyond the plan outline of trailer T, so that the height of wheels 38 from the surface supporting the wheels 26 is slightly less than the vertical distance between the car floor and the side rails 30, a trailer incorporating these devices may be loaded on a low-side gondola car and rolled along it longitudinally, utilizing side rails 30 as track rails.

Brackets 34 are provided with additional holes 44 for registry with holes 46 in crossbearer 32 so that when the trailer is to be used in highway service, brackets 34 may be swung inwardly about pivots 33 to the position shown in Fig. 2, in which they are entirely within the plan outline of trailer T, and secured thereat by passing pin 42 through registering openings 44 and 46. This is necessary in order to comply with legal highway clearance limitations.

For preventing vertical and longitudinal movement of the trailer relative to the gondola car body, a ledge in the form of a channel 48 is secured to the inside surface of side walls 14 parallel to and slightly below side rail 30 so that the opening in channel 48 is in registry with bosses 40 of brackets 34. The horizontally extending flanges of channel 48 are perforated at equally spaced intervals over their entire length, as at 52, to receive pins 54. The perforations are so spaced that a pin can be located immediately on either side of boss 40, thus preventing longitudinal movement of boss 40 in the channel and consequent longitudinal movement of the trailer body with respect to the gondola car body. Vertical movements of boss 40 are, of course, restrained by the under surface 48A of the upper flange of channel 48 so that accordingly vertical movements of the trailer body, with respect to the gondola body are similarly prevented.

Figure 8:
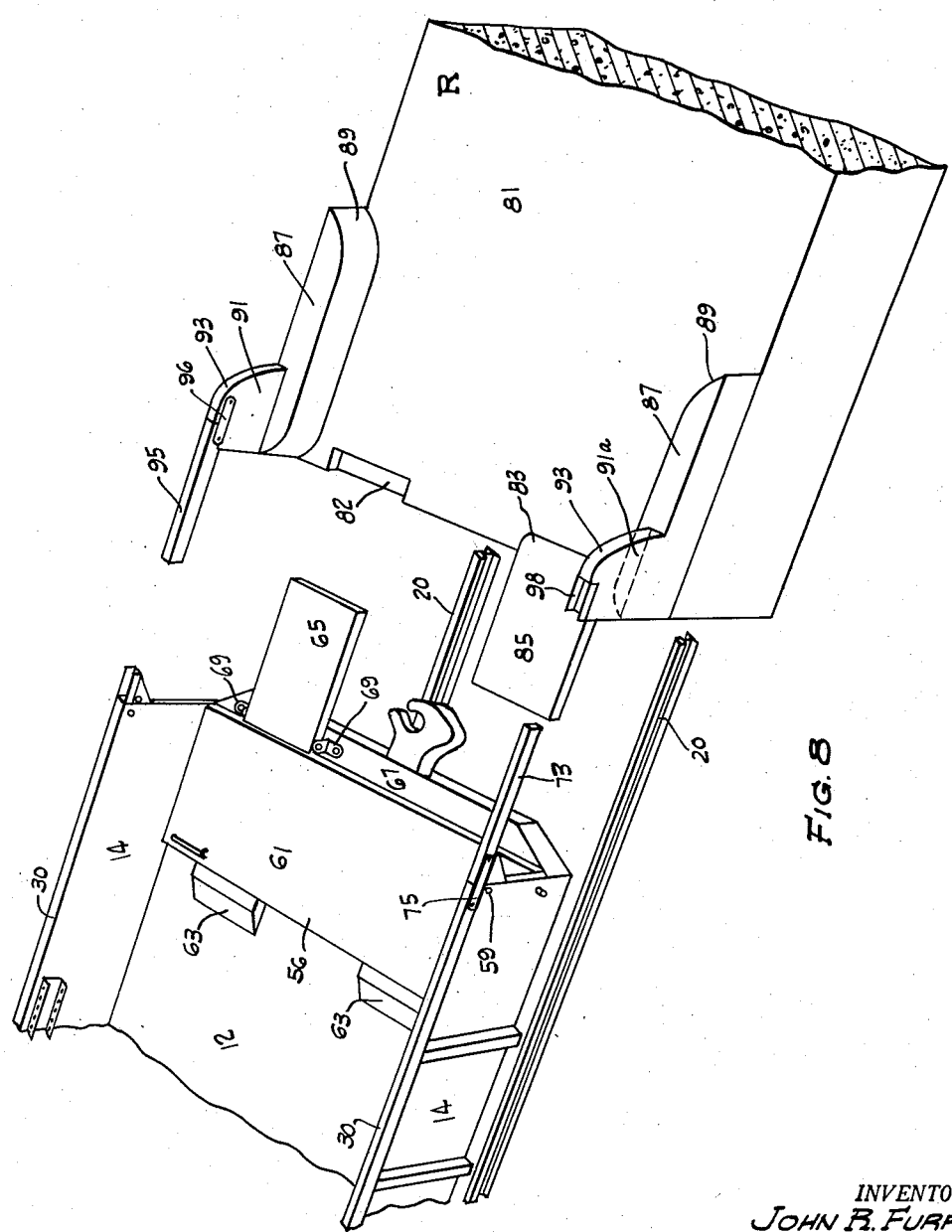
Fig. 8 is a perspective view showing the end portion of a gondola with its end dropped and its communicating bridge and side rail extended, and a cooperating loading ramp with its communicating rail and bridge extended.

In order to load trailers on gondola cars in the manner described above, the ends of the gondola cars C for use in this type of service are modified, as best shown in Figs. 6, 7 and 8. Drop-end 56 extends the full width of the car and is substantially flush with the inner side of side walls 14. To permit it to drop inwardly, it is hinged at its lower edge either to the side walls 14 or floor 12; it is provided with locking means such as slidable bolt 58 and cooperating recess 59 in the side wall. When end 56 is lowered, its upper surface functions as a roadway for the road wheels of trailers being loaded on the gondola. Accordingly, the upper or outer surface 61 of end 56 is smooth rather than corrugated as in conventional constructions. To provide a transition from the surface 61 to end 56 and to car floor 12 a pair of wedge-shaped ramps 63 are mounted on floor 12 so as to be in abutting relation with the upper edge of end 56 when end 56 is lowered. The left-hand side of each end of gondola car C is provided with a floor extension 65 hinged immediately outside of end 56 to the projecting portion 67 of floor 12 by means of brackets 69. During transit and at all times except when the car is being loaded, floor extensions 65 are held in the vertical position in abutting relation to outer surface 61 of end 56 by sliding bolt 71.

For bridging the gap between side rails 30 of adjacent cars, a side rail extension 73 is mounted on the righthand side rail of the car adjacent the end. Side rail extension 73 consists of a box member, the thickness of which is the same as that of side rail 30. It is secured to side rail 30 near its end by an offset hinge comprising a pair of links 75 pivotally secured at one end to the side rail and at the other end to extension 73. For supporting the hinged end of extension 73 when in the extended position, a bracket 76 is secured to the end of right-hand side wall 14 just below side rail 30. For supporting the free end of corresponding side rail extensions on adjacent cars, a similar bracket 77 is mounted on the end of the left-hand side of the car, and supports an upwardly facing channel element 79 to receive and act as a guide for the free end of the other car's side rail extension.

Fig. 7 shows adjacent ends of a pair of cars with floor extensions and side rail extensions in the extended position and with ends 56 lowered. The cars are shown uncoupled so as to better illustrate the relationship between the cooperating elements. However, it is to be understood that when the cars are coupled the free ends of floor extensions 65 are adapted to rest on projecting floor portions 67 of the adjacent cars, and the free ends of side rail extensions 73 are adapted to rest in channel brackets 79 of the adjacent cars so that regardless of how many cars of this type may be coupled together, side rails 30 and side rail extensions 73 present a continuous track for trailer auxiliary wheels 38, and floors 12, ramps 63, ends 56 and floor extensions 65 constituting bridge elements present a continuous roadway the entire length of the coupled cars, as shown in Fig. 1.

For introducing trailers into the end car of a series of coupled cars, an elevated ramp R, of concrete, masonry or other substantial construction is provided, the roadway or upper surface 81 of ramp R being the same height as the supper surface 61 of lowered car end 56. Ramp R is located at the end of a stub siding, and is substantially the same width as a gondola car. The edge facing the end of the track is provided with a recess 82 to receive the free end of bridge element 65 of gondola car C, and a second recess 83 to pivotally mount an end of a similar bridge element 85, so that when gondola car C is moved to the adjacent end of the stub siding consisting of track rails 20, floor extension or bridge element 65 will rest on the bottom of recess 82 and ramp bridge element 85 will rest on the end 67 of the gondola car floor. Means are also provided to guide trailer auxiliary wheels 38 onto the side rails. These include curbs 87 on ramp R bevelled, as at 89, to guide trailer road wheels 26, and ramp side wall portions 91 and 91a curved on the approach side, as at 93, to receive trailer auxiliary wheels 38. Righthand ramp side wall portion 91 is provided with a side wall extension 95 which may be hingedly mounted to it by means of links 96. Side rail extension is similar in construction, size and shape to gondola side rail extensions 73 and is adapted, when extended to rest in channel bracket 79 of the gondola car. Left-hand ramp side wall portion 91a is provided with a channel shaped recess 98, similar to channel bracket 79, to guidably receive the free end of gondola side rail extensions 73.

The operation of my system is as follows: A train of gondola cars, each equipped as described above with side rail extensions 73, floor extensions 65, flat surface ends 56, and locking channels 48, is backed to the end of a stub siding terminating in ramp R. Car handbrakes are set, to prevent movement of the cars away from the ramp. Ends are lowered, and floor and side rail extensions are extended, between the cars, and between the car adjacent the ramp and the ramp.

The trailers are prepared for loading by swinging the auxiliary wheel brackets 34 from the retracted highway position, as shown in Fig. 2 to the extended position shown in Fig. 3, and securing them in place by pins 42. With auxiliary wheels 38 extended, the trailers are backed up ramp R. As the trailer end approaches the end of ramp R, trailer wheels 26 engage the curved ends 89 of curbs 87 so that the trailer is aligned with the gondola cars. With the trailer thus aligned as it is pushed toward the car end, auxiliary wheels 38 engage the rounded ends 93 of ramp side walls 91, so that regardless of how heavily the trailer is loaded, the rear auxiliary wheels are raised to the level of the side rails. As the trailer continues rearwardly, it is guided onto the car C by side rail extensions 73 and 95, and its main wheels 26 are supported by floor extensions 65 and 85. Rear auxiliary wheels 38 then roll on gondola side rails 30, and the bosses 40 of rear brackets 38 slide into the open ends of locking channels 48; meanwhile the main wheels 26 of the trailer roll over the smooth upper surface 61 of car end door 56, and make the transition to the car floor 12 by means of ramps 63. As the forward end of the trailer, supported by the tractor, approaches the end of the ramp, its forward auxiliary wheels may be sufficiently elevated to clear the top of the ramp side rails, as shown in Fig. 1, the full weight of the tractor rear end and trailer forward end being supported by floor extensions 65 and 85, and by car end 56 until the rear tractor wheels descend to the car floor via ramps 63. When this occurs, the forward auxiliary wheels 38 engage car side rails 30, and the trailer may be pushed rearwardly through the car and adjacent cars by the tractor, guided by the engagement of the auxiliary wheel flanges and the side rails. In this connection, it should be noted that the spacing of the ends of locking channels 48 some distance inwardly from ramps 63 permitted bosses 40 of the auxiliary wheel brackets to enter the locking channel ends when the auxiliary wheels dropped into engagement with the side rails.

The close proximity of vertical surfaces 34A, 40A of bracket 34 to the adjacent surfaces of channels 48 of side walls 14 as the trailer T moves longitudinally of car C between walls 14 further provides lateral guidance of trailer T in such longitudinal movement. For instance, if a wheel 38 is damaged so as to impair the guidance normally provided by wheels 38, one or more of the surfaces 34A, 40A will come into sliding contact with the adjacent wall 14 and thus provide guidance.

When all auxiliary wheels are engaged with the side rails, the trailer may be moved through the car or cars to its ultimate position either by the tractor or pulled by a winch actuated cable (not shown). In either case, in passing from car to car, the auxiliary wheels roll over the side rail extensions 73, and the highway wheels are supported by the ramps 63, ends 56, and floor extensions 65. When each trailer reaches its ultimate position, pins 54 are inserted in holes 52 in locking channel 48, adjacent opposite sides of boss 40 of bracket 34, thereby preventing longitudinal movement of the trailer in the car.

When all cars are loaded, car ends 56 are closed, and locked, side rail and floor extensions 73 and 65, respectively are retracted, and the cars are ready for movement to their destination. Releasing and unloading the trailers from the cars is accomplished by reversing the loading and securing procedure.

This invention may be modified as will occur to one skilled in the art and exclusive use is contemplated of all modifications and embodiments, as come within the scope of the appended claims.

What is claimed is:

1. A highway vehicle comprising an elongated body, highway wheels operatively connected to said body, said body having firmly connected thereto adjacent each end thereof a transversely extending underframe member, each said member having connected thereto a pair of brackets, each bracket having at its outer end an anti-friction element for rolling engagement along the top of a gondola car side top rail, each bracket further being movable from a position entirely within the plan outline of said vehicle body to an extended position at least in part beyond said outline and in which said element rests upon said top rail, said vehicle further comprising means for retaining said brackets in one or the other of said positions.

2. In a system for transporting wheeled highway vehicles by rail, a railway gondola car having a floor and spaced apart side walls having top, side rails and an inwardly extending flanged channel member mounted on the inner side of each side wall adjacent and substantially parallel to the side rail thereof, brackets pivoted to the body of the highway vehicle and movable to extend laterally outwardly therefrom and carrying anti-friction means mounted thereon and at a distance above the floor slightly less than the height of the top of the side rails from the floor, the anti-friction means resting on the side rails to prevent downward movement of the vehicle when said vehicle is loaded on the gondola car with the vehicle wheels resting on said floor between said side walls, said brackets also carrying bosses extending laterally outwardly from said vehicle body and engaging an under surface of one of the flanges on the channel member to prevent upward movement of the highway vehicle with respect to the gondola car.

3. The invention as claimed in claim 2, wherein the flanges are perforated at longitudinal intervals with pins insertable in the perforations adjacent said bosses for preventing longitudinal movement of the vehicle with respect to the car.

4. The invention as claimed in claim 2, wherein means are provided for vehicular passage from one car to another, comprising side rail extensions hingedly secured to diagonally opposite corners of the car, one of said extensions being connected to an end of each said rails and swingable to a position in prolongation of said rail and extending continuously therefrom to the rail of the adjacent car, drop-ends hingedly mounted on said car and swingable inwardly to a horizontal position and provided with a substantially smooth outer surface, said floor having at each end portion a portion projecting beyond said drop-ends, a pair of floor extensions hingedly secured to the car floor near diagonally opposite corners of each car longitudinally outside of the drop-ends and swingable to a position in which their free ends rest on the projecting floor portions of the adjacent cars, said floor being provided with wedge-shaped ram portions positioned for substantially abutting relation with the upper edge of said drop-ends when said drop-ends are in the horizontal position, whereby a relatively smooth continuous floor and side rails can be provided regardless of the number of cars arranged in longitudinal relation with each other.

5. In a system for transporting wheeled highway vehicles by rail, a railway gondola car having a floor, spaced apart load carrying side walls provided with top side rails and a drop-end hingedly mounted on said car and swingable to a horizontal position between the side walls, a rectractable floor extension pivotally secured to each projecting portion of said floor and swingable to a position resting on the projecting portion of the floor of adjacent cars, said floor having at each end a portion projecting longitudinally beyond said drop-ends, retractable side rail extensions hingedly secured to an end of each of said rails and swingable to a position over adjacent cars and being of sufficient length to bridge the space between the rails on adjacent cars, a pair of brackets mounted on each side of the body of the highway vehicle and carrying flanged antifiction means thereon and movable to bring the anti-friction means to rest upon the said side rails, when the highway vehicle is moved onto the car, the said vehicle having wheels resting on the floor of the car to provide means for conveying the vehicle upon the car, the side rails serving to support and guide the highway vehicle by means of the anti-friction means on the said bracket, said side rails and said side rail extensions constituting a continuous guide for said flanged anti-friction means of highway vehicles, whereby to facilitate movement of said highway vehicles from car to car, and means for securing said highway vehicles to said side walls.

References Cited in the file of this patent

UNITED STATES PATENTS

| | | |
|---|---|---|
| 658,525 | Huse | Sept. 25, 1900 |
| 1,734,303 | Ross | Nov. 5, 1929 |
| 2,052,867 | Cartzdafner et al. | Sept. 1, 1936 |
| 2,144,081 | Porte | Jan. 17, 1939 |

FOREIGN PATENTS

| | | |
|---|---|---|
| 116,456 | Australia | Jan. 18, 1943 |
| 388,168 | Great Britain | Feb. 23, 1933 |
| 393,370 | Great Britain | June 8, 1933 |
| 431,500 | Great Britain | July 9, 1935 |
| 458,277 | Great Britain | Dec. 16, 1936 |
| 664,316 | France | Apr. 22, 1929 |